United States Patent [19]

Lechanu et al.

[11] 4,132,399
[45] Jan. 2, 1979

[54] COMPOSITE SEAL RING

[75] Inventors: Jacques Lechanu, Colombes; Fernand Gilbaut, Domont, both of France

[73] Assignee: Societe Anonyme dite: Le Joint Francais, Paris, France

[21] Appl. No.: 887,411

[22] Filed: Mar. 15, 1978

[30] Foreign Application Priority Data

Mar. 23, 1977 [FR] France .................. 77 08729

[51] Int. Cl.² .................. F16J 15/12; F16J 15/08
[52] U.S. Cl. .................. 277/47; 277/153; 277/157; 277/198; 277/226
[58] Field of Search .................. 277/45–49, 277/61, 62, 153, 157, 163, 164, 198, 226

[56] References Cited

U.S. PATENT DOCUMENTS

| 1,594,838 | 8/1926 | Kegresse | 277/47 |
| 1,807,567 | 5/1931 | Clark | 277/47 |
| 3,575,428 | 4/1971 | Fuhrmann et al. | 277/153 |

FOREIGN PATENT DOCUMENTS

| 1325081 | 3/1963 | France | 277/198 |
| 1358912 | 3/1964 | France | 277/198 |
| 1592109 | 6/1970 | France | 277/198 |
| 2119258 | 8/1972 | France | 277/198 |
| 2238098 | 2/1975 | France | 277/153 |
| 2298042 | 8/1976 | France | 277/198 |

Primary Examiner—Robert S. Ward, Jr.
Attorney, Agent, or Firm—Haseltine, Lake & Waters

[57] ABSTRACT

A composite seal ring intended to be compressed between two surfaces which are to be applied against each other in a sealed manner, wherein the composite seal ring comprises firstly a metal seal ring comprising a core constituted by a spiral spring surrounded by a metal sheath which provides two peripheral lips projecting outwardly substantially in the mid-plane of the said metal seal ring, and secondly by a toroidal elastomer seal which surrounds the said metal seal ring, together with members for connecting the toroidal elastomer seal to the metal seal ring, said members being freely lodged between the projecting lips of the said metal seal ring and being rigidly lodged in a corresponding slot of the said toroidal elastomer seal.

12 Claims, 2 Drawing Figures

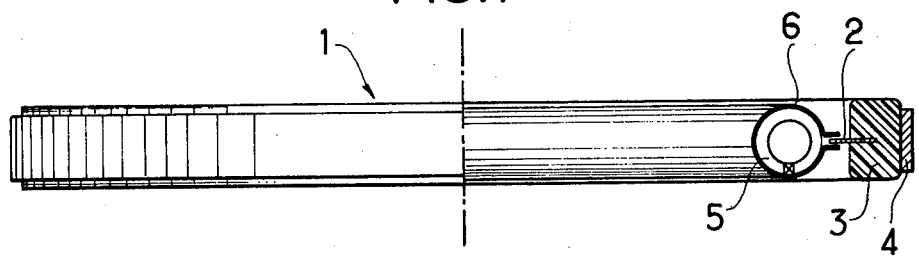
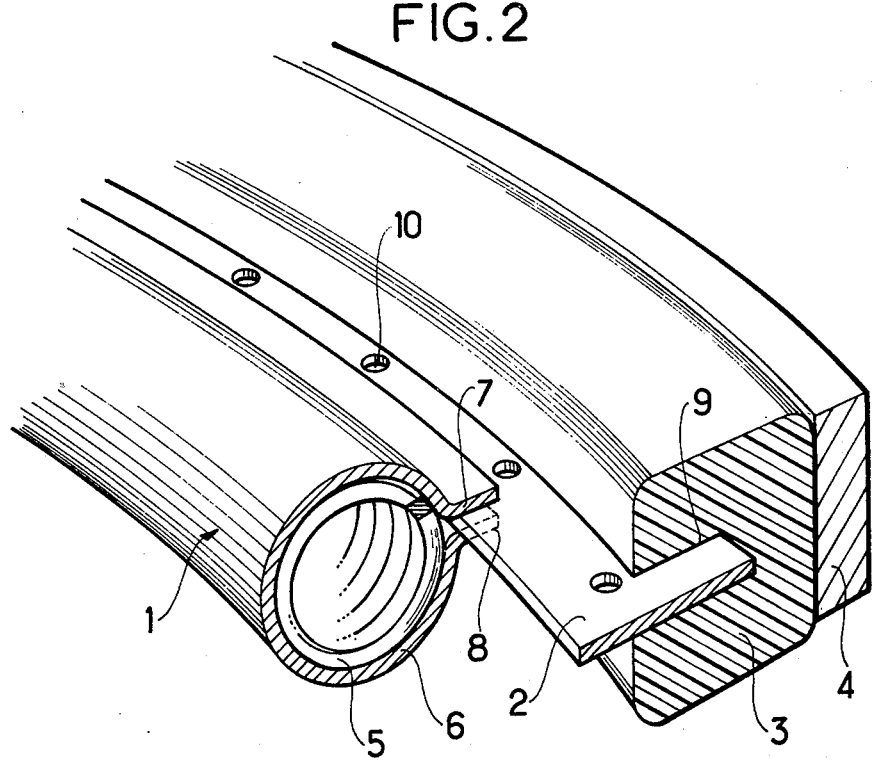

COMPOSITE SEAL RING

The present invention relates to composite seal rings, in particular those intended to be compressed between two surfaces which are to be applied against each other in a sealed manner.

Metal seal rings, in particular those of the type comprising a core constituted by a spiral spring surrounded by a metal sheath, are being used increasingly at present. This is particularly because of their high temperature performance and their long life which are both much better than those of elastomer seals. It is intended to use them in applications connected with relatively dangerous environments, for example: nuclear energy and technologies which use highly toxic gasses, acid solutions or generally different types of dangerous material.

Now, the use of metal seals in dangerous applications raises a critical leakage testing problem before use, not to mention the safety measures which it is sometimes essential to take to prepare for a possible breakdown of the metal seal.

Preferred embodiments of the present invention to provide a composite seal ring which includes a metal seal and which is so constituted as to enable the metal seal to be tested for leakage. Some embodiments can even be tested when in operation: The said preferred composite seals provide, in addition, a high degree of security during operation because they maintaining some degree of sealing even in the event of a more or less major breakdown of the metal seal.

More particularly, the present invention provides a composite seal ring intended to be compressed between two surfaces which are to be applied against each other in a sealed manner, wherein the composite seal ring comprises: firstly a metal seal ring comprising a core constituted by a spiral spring surrounded by a metal sheath which provides two peripheral lips projecting outwardly substantially in the mid-plane of the said metal seal ring; and secondly by a toroidal elastomer seal which surrounds the said metal seal ring together with members for connecting the toroidal elastomer seal to the metal seal ring vided, said members being freely lodged between the projecting lips of the said metal seal ring and being rigidly lodged in a corresponding slot of the said toroidal elastomer seal.

The composite seal ring according to the invention may also include at least one of the following characteristics:

the connecting members constitute a flat annulus which is lodged and fixed in a corresponding peripheral slot of the toroidal elastomer seal, the said annulus projecting from said toroidal seal substantially in the mid-plane of the metal seal ring, for seal rings of very large dimensions the flat annulus is constituted from two identical half annuluses placed end to end;

the toroidal elastomer seal is laterally supported by an outer metal rim, and is preferably glued to the adjacent surface of the metal rim to facilitate assembly of the said composite seal ring;

the radial section of the toroidal elastomer seal is square with chamfered corners, is octogonal or is round;

the toroidal elastomer seal is intended to be compressed by 25% in operation;

the flat annulus has a plurality of orifices disposed around the said annulus in a zone which is neither lodged in the totoidal elastomer seal nor lodged between the two projecting lips of the metal seal, thereby facilitating the evacuation of the space lying between the said metal seal ring and the said toroidal elastomer seal;

the elastomer constituting the toroidal seal is chosen independently of the operating conditions of the said composite seal, thereby enabling the metal seal ring to be tested under ambient conditions by evacuation of the space lying between the said metal seal ring and the said toroidal elastomer seal; and the elastomer constituting the toroidal seal is chosen to be compatible with the operating conditions of the composite seal in order: firstly to enable the metal seal to be tested both under ambient and under operating conditions by evacuating the space lying between the the said metal seal ring and the said toroidal elastomer seal; and secondly to enable the toroidal elastomer seal to stand in for the metal seal ring in the event of its breakdown.

Other advantages and characteristics of the invention will appear more clearly in the light of the following description given by way of example that is in no way limiting and with reference to the Figures of the single sheet of the accompanying drawing in which:

FIG. 1 is a plan view, half in axial section, of a composite seal ring in accordance with the invention; and FIG. 2 is a partial perspective view of the seal ring of FIG. 1;

In FIG. 1, a composite seal ring in accordance with the invention comprises firstly a metal seal ring 1 having by a spiral spring (made of square section wire in this case) which is surrounded by a metal sheath 6 which is advantageously made of ductile metal, and secondly a toroidal seal 3 made of elastomer and held laterally by an outer metal strip 4 which surrounds the said metal seal ring.

The metal sheath 6 does not completely surround the core of the metal seal ring, but ends in two peripheral lips 7 and 8 projecting outwardly and substantially in the mid plane of the said metal seal ring. The said lips are flattered to be substantially parallel to each other and they are not welded together deliberately in order: firstly to leave sufficient play to enable connecting members to be freely lodged therebetween as is described in detail below; and secondly to permit the spring core to deform freely under compression.

In accordance with the invention, the composite seal ring includes connecting members freely lodged between the projecting lips 7 and 8 of the metal seal ring 1 for connecting the toroidal elastomer seal 3 to the said metal seal ring. In FIGS. 1 and 2 the connecting members constitute a flat annulus 2 which is generally made of metal and is lodged and fixed by glue in a corresponding peripheral slot 9 of the toroidal elastomer seal 3. The said annulus projects from the said toroidal seal generally in the mid-plane of the metal seal ring 1 such that the only degree of real freedom resides in the free lodging of the annulus 2 between the projecting lips 7 and 8. Indeed it is most important to retain the possibility of letting the connecting elements slide because of the deformation of the composite seal ring (and in particular of the spring core 5) when compressed. When the composite seal ring is of very large dimensions, it can be very useful for the annulus to be formed by juxtaposing several sectors end to end, and in particular an assembly of two identical half annuluses is readily envisageable.

The toroidal elastomer seal 3 is preferably laterally supportedby an outer metal rim 4. Indeed, the metal rim 4 whose mechanical strength must be sufficient to withstand the expected high pressures (which may rise to 500 kg per linear cm) can play a very important role in operation. The said rim acts both as a limiter of the outward expansion of the toroidal elastomer seal 3 and as a limiter of the crushing force to which both the toroidal elastomer seal and the metal seal ring are subjected. The function of limiting inward expansion of the toroidal elastomer seal 3 is provided by the annulus 2 glued in its 3 is provided by the annulus 2 glued in its lodging slot 9. Further, to facilitate assembly of the composite seal ring, the toroidal elastome seal 3 may be glued to the adjacent surface of the metal rim 4.

The toroidal elastomer seal may have a radial section which is square with chamfered edges (as shown in the Figures), which is octogonal, or which is round; in operation the seal is intended to be compressed by about 25%.

It was mentioned above that the composite seal ring in accordance with the invention provides interesting posibilities in leakage testing of the metal seal ring. With any embodiment of the invention it is possible to carry out a simple leakage test under ambient conditions, ie before it is brought into operation, by evacuating (to the second degree if need be) the space lying between the said metal seal ring and the toroidal elastomer seal, if there is then a leak there is every chance that there will be one under operating conditions. But it is equally possible, by choosing an elastomer which is compatible with the operating conditions, to carry out a leakage test of the metal seal ring while it is in operation under normal operating conditions, provided that the toroidal elastomer seal can stand in for the metal seal ring without danger in the event of the metal seal ring breaking down. This can be a considerable advantage for use in dangerous applications. Further, to facilitate the evacuation, it may be advantageous for the flat annulus 2 to have a plurality of orifice 10 disposed around the said annulus in a zone which is neither lodged in the toroidal elastomer seal 3 nor lodged between the two projecting lips of the metal seal ring 1.

By way of example and according to the application intended, the choice of elastomer could be a butyl for temperatures up to 130° C., an ethylene-propylene for temperatures up to 150° C. or an elastomer of the type sold under the trade mark Viton for temperatures up to 200° C.

Naturally the present invention is in no way limited to the examples which hare been described by way of illustration, but includes any variants which come within the definition of the invention as claimed.

What is claimed is:

1. A composite seal ring intended to be compressed between two surfaces which are to be applied against each other in a sealed manner, wherein the composite seal ring comprises firstly a metal seal ring comprising a core constituted by a spiral spring surrounded by a metal sheath which provides two peripheral lips projecting outwardly substantially in the mid-plane of the said metal seal ring, and secondly by a toroidal elastomer seal which surrounds the said metal seal ring, together with members for connecting the toroidal elastomer seal to the metal seal ring, said members being freely lodged between the projecting lips of the said metal seal ring and being rigidly lodged in a corresponding slot of the said toroidal elastomer seal.

2. A composite seal ring according to claim 1 wherein the connecting members constitute a flat annulus which is lodged and fixed in a corresponding peripheral slot of the toroidal elastomer seal, the said annulus projecting from said toroidal seal substantially in the mid-plane of the metal seal ring.

3. A composite seal ring according to claim 2, wherein the flat annulus is constituted from two identical half annuluses placed end to end.

4. A composite seal ring according to claim 1 wherein the toroidal elastomer seal is laterally supported by an outer metal rim.

5. A composite seal ring according to claim 4, wherein the toroidal elastomer seal is glued to the adjacent surface of the metal rim to facilitate assembly of the said composite seal ring.

6. A composite seal ring according to claim 1 wherein the radial section of the toroidal elastomer seal is square with chamfered corners.

7. A composite seal ring according to claim 1 wherein the toroidal elastomer seal has an octogonal radial section.

8. A composite seal ring according to claim 1 wherein the toroidal elastomer seal has a round radial section.

9. A composite seal ring according to claim 1, wherein the toroidal elastomer seal is intended to be compressed by 25% in operation.

10. A composite seal ring according to claim 1, wherein the flat annulus has a plurality of orifices disposed around the said annulus in a zone which is neither lodged in the toroidal elastomer seal nor lodged between the two projecting lips of the metal seal, thereby facilitating the evacuation of the space lying between the said metal seal ring and the said toroidal elastomer seal.

11. A composite seal ring according to claim 1, wherein the elastomer constituting the toroidal seal is chosen independently of the operating conditions of the said composite seal thereby enabling the metal seal ring to be tested under ambient conditions by evacuation of the space lying between the said metal seal ring and the said toroidal elastomer seal.

12. A composite seal ring according to claim 1 wherein the elastomer constituting the toroidal seal is chosen to be compatible with the operating conditions of the composite seal in order: firstly to enable the metal seal to be tested both under ambient and under operating conditions by evacuating the space lying between the said metal seal ring and the said toroidal elastomer seal; and secondly to enable the toroidal elastomer seal to stand in for the metal seal ring in the event of its breakdown.

* * * * *